UNITED STATES PATENT OFFICE 2,660,531

PRODUCTION OF VITREOUS GLAZES OR ENAMELS FOR COATING METALS

Reginald Percy Fraser, Surrey, and Alfredo Luigi Cianchi, Hampstead, London, England No Drawing. Application May 16, 1949, Serial No. 93,639

Claims priority, application Great Britain June 1, 1948

7 Claims. (Cl. 106—48)

This invention relates to the vitreous glazing or vitreous enamelling of the surface of aluminium and aluminium base alloys and articles thereof.

Glazes and vitreous enamels suitable for application to aluminium have hitherto been prepared containing high percentages of lead oxide in order to attain the required low fusion or maturing temperature.

There are certain trade restrictions that render the manufacture and use of vitreous enamelling compositions containing lead objectionable. One of the objects, therefore, of the present invention is to provide an improved lead-free vitreous enamel composition suitable for the surface finishing of aluminium and its alloys.

Owing to the low melting point of aluminium and its alloys as compared with iron or steel, the vitreous enamel compositions available and commonly used for the enamelling of iron by the usual "stoving" or furnace treatment at temperatures from 800° C. to 1100° C. cannot be used for enamelling aluminium or its alloys by "stoving" or furnace treatment. A further object of the present invention is, therefore, to provide a lead-free vitreous enamelling composition having a fusion or maturing temperature below 600° C.

Owing to the high co-efficient of thermal expansion of aluminium and its alloys, as compared with steel or glassware and ceramic ware, a still further object of the invention is to provide a lead-free enamelling composition for aluminium and its alloys which has a thermal co-efficient of expansion approximately the same as that of the aluminium or alloy thereof to be enamelled, as otherwise the enamel will flake off or distor the enamelled article.

Owing to the ductility and softness of aluminium compared with steel or ceramic bodies, a still further object of the invention is to provide a lead-free enamelling composition for aluminium and its alloys which becomes chemically bonded to the aluminium during the stoving treatment, preferably without special pretreatment of the aluminium surface, so that bending or denting of the aluminium does not throw off the enamel.

Owing to the exceptionally low softening point required in an enamel for aluminium a still further object of the invention is to provide a lead-free enamelling composition for aluminium and its alloys which retains a high degree of surface hardness to prevent abrasion and also a high degree of chemical resistance against water, dilute acids, and alkalies.

Ceramic glazes and enamels for iron and steel and ceramic ware usually have, calculated as mole percentages,

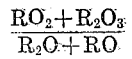

ratios varying from 1.5 to as high as 12.0 with maturing temperatures ranging from 700° C. to 1200° C. where $R_2O$ stands for the oxides of the elements Li, Na and/or K (of group I of the periodic table); RO stands for the oxides of the elements Mg, Ca, Zn, Sr and/or Ba (of group II); $R_2O_3$ stands for the oxides of the elements B and/or Al (of group III) and $RO_2$ stands for the oxides of the elements Si, Ti, Zr and/or Sn (of group IV).

It has previously been thought that ceramic glazes and enamels even without lead having a

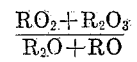

ratio below 1.5 are commercially useless, having far too high a solubility; nevertheless our novel compositions have

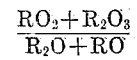

ratios not exceeding 1.5 and have a hardness on the Moh's scale of No. 6 and good chemical resistance.

Certain lead-free vitreous enamels having a fusion or maturing temperature below about 622° C. have been proposed for use on glassware or ceramic ware. The total constituents of such compositions expressed as mole percentages can be arranged in the following groups of oxides:

$R_2O$, 13–24%; RO, 6–20%;
$R_2O_3$, 44–57%; $SiO_2$, 9–25%

It will be noticed that such compositions are characterised by an exceptionally high percentage of the group of oxides $R_2O_3$, this group consisting of aluminium oxide, which ranges from 12 to 17%, and boric oxide which ranges from 25 to 40%, and that the ratio $$\frac{SiO_2+R_2O_3}{R_2O+RO} \text{ ranges from } \frac{53}{44} \text{ to } \frac{82}{19}=1.2 \text{ to } 4.3$$

In contrast with such compositions it is important to note that because the thermal coefficient of expansion of aluminium and its alloys is much higher than that of glass or ceramic materials, our glazing compositions do not contain more than a moderate percentage of boric oxide, which has a very low co-efficient of expansion. Moreover, in the case of applying vitreous enamelling compositions to the surface of aluminium or its alloys, the ideal bonding to the metal or alloy by the glazing composition is one which establishes a chemical combination with the oxide film on the aluminium surface or a gradation of aluminium content from a maximum in the metal to a minimum in the glaze. Therefore, our vitreous enamelling composition for application to aluminium or its alloys does not of itself contain a high percentage of aluminium oxide because at the interface the aluminium oxide itself is present and will tend to increase the aluminium content in the interface of the applied composition and establish the bond referred to.

The co-efficient of thermal expansion of aluminium and its alloys in the temperature range 10–100° C. lies between $20.0 \times 10^{-6}$ and $24.0 \times 10^{-6}$ whereas steel in the same temperature range has a co-efficient of $10.0 \times 10^{-6}$. Lead-free glazes and enamels have hitherto been prepared having, in the same temperature range, co-efficients up to $12.0 \times 10^{-6}$. Enamels according to this invention should, therefore, have co-efficients of thermal expansion greater than $15.0 \times 10^{-6}$ between 10°–100° C.

According to the present invention we provide lead-free vitreous enamelling compositions suitable for bonding to the surface of aluminium or aluminium base alloys and having fusion or maturing temperatures for stoving below 600° C. To ensure maximum suitability for bonding to the aluminium or aluminium base alloys the co-efficients of thermal expansion of the compositions are greater than $15.0 \times 10^{-6}$ in the temperature range 10°–100° C. A further property of the new compositions is that they have ratios of $$\frac{RO_2+R_2O_3}{R_2O+RO}$$

below 1.5.

More particularly the lead-free low-melting glazing compositions according to our invention contain high contents of alkali oxides and alkaline earth oxides and a comparatively low content of $B_2O_3$ with or without a low content of $Al_2O_3$.

Expressed as mole percentages the main constituents of our new glazing compositions are characterised by a combination of the groups of oxides as follows:

$R_2O$, 21–36%; $RO$, 17–30%;

$R_2O_3$, 8–17%; $RO_2$, 18–51% of which 18–36% is $SiO_2$.

Thus, the ratio $$\frac{SiO_2+R_2O_3}{R_2O+RO}=\frac{26 \text{ to } 53}{66 \text{ to } 38}=0.395 \text{ to } 1.40$$

The main constituents of our novel glazing compositions can be expressed as mole percentages within the following ranges:

TABLE I

| | |
|---|---|
| Sodium oxide and potassium oxide with or without lithium oxide | 21 to 36% $R_2O$ |
| Barium oxide with or without calcium oxide or strontium oxide or zinc oxide | 17 to 30% $RO$ |
| Boric oxide, 8 to 13%<br>Aluminium oxide, 0 to 4% | 8 to 17% $R_2O_3$ |
| Silica | 18 to 36% $SiO_2$ ($RO_2$) |

It will be observed that not only is there an absence of lead in the composition but that the proportion of boric oxide does not exceed 13 mole percent and the proportion of aluminium oxide does not exceed 4 mole percent, whilst the $R_2O_3$ content does not exceed 17%. On the other hand, the alkali oxide and alkali earth oxide percentages are high.

To the above composition may be added one or more of the following opacifiers:

| | |
|---|---|
| Titanium oxide ($TiO_2$) | 0 to 15% |
| Zirconium oxide ($ZrO_2$) | 0 to 5% |
| Tin oxide ($SnO_2$) | 0 to 5% |

0 to 15% $RO_2$ raising the possible $RO_2$ content of the glazes that are opacified up to 51%.

The following is a weight percentage table of dry-batch components for treatment to make "frits" which produce enamels as above specified:

TABLE 2

*Percent dry batch compositions*

| | 1 | 2 | 3 | 4 | 5 | 6 | 7 | 8 | 9 | 10 | 11 | 12 |
|---|---|---|---|---|---|---|---|---|---|---|---|---|
| Lith. carb., $Li_2CO_3$ | 5.1 | 6.8 | 6.3 | 5.1 | 5.6 | 7.8 | 8.6 | 8.6 | 9.0 | 6.4 | 7.8 | |
| Sod. ash., $Na_2CO_3$ | 5.8 | 5.2 | 5.0 | 5.8 | 5.9 | 7.5 | 7.9 | 6.7 | 8.1 | 8.9 | 7.8 | 10.2 |
| Pot. carb. (anhydrous), $K_2CO_3$ | 3.8 | 7.2 | 6.6 | 9.8 | 6.0 | 4.3 | 6.6 | 7.1 | 10.9 | 11.4 | 10.6 | 15.5 |
| Stront. carb., $SrCO_3$ | 1.8 | | | | | | | | 3.5 | | | |
| Calc. carb., $CaCO_3$ | 6.7 | 10.8 | 11.4 | | 16.7 | 10.0 | 12.7 | 13.0 | 13.2 | 15.7 | 14.5 | 13.9 |
| Barium carb., $BaCO_3$ | 25.0 | 24.9 | 28.8 | 36.4 | 19.0 | 18.7 | 12.8 | 13.0 | 12.4 | 14.3 | 14.2 | 13.7 |
| Zinc oxide, ZnO | | | | | | | | | | | | 1.4 |
| Borax, $Na_2B_4O_7.10H_2O$ | 15.7 | 22.0 | 20.2 | 23.0 | 20.0 | 19.3 | 21.8 | 21.6 | 19.7 | 20.8 | 21.6 | 19.9 |
| Silica, $SiO_2$ | 11.0 | 5.0 | 9.1 | 7.2 | 7.1 | 8.6 | 8.5 | 9.1 | 9.0 | 7.6 | 6.9 | 9.1 |
| Felspar, $K_2O.Al_2O_3.6SiO_2$ | 13.2 | 10.9 | 10.5 | 9.1 | 12.4 | 10.9 | 10.9 | 11.1 | 12.5 | 13.3 | 15.0 | 16.2 |
| Titanium diox., $TiO_2$ | 6.2 | 6.1 | 1.1 | 2.4 | 5.6 | 9.9 | 6.2 | 6.0 | | | | |
| Zirconium oxide $ZrO_2$ | 1.0 | 1.1 | 1.0 | 1.2 | 1.7 | 1.0 | 1.0 | 1.5 | 1.7 | 1.6 | 1.6 | |
| Tin oxide, $SnO_2$ | 4.7 | | | | | 2.0 | 3.0 | 2.3 | | | | |

The ingredients used in making up a batch composition may take the form of oxides, carbonates, nitrates or silicates. In the case of alumina, at least some of it is preferably taken in the form of potash felspar.

To prepare any selected composition the component materials (other than any desired colouring oxides) are mixed together and then heated and melted and fritted in water and then ground and pulverised. During the grinding process traces of colouring oxides or opacifiers may be added for colouring the eventual glaze.

The resulting "frits" expressed as a combination of oxides in percentages by weight will be respectively as follows:

TABLE 3

Frit compositions—percentage oxides

|  | 1 | 2 | 3 | 4 | 5 | 6 | 7 | 8 | 9 | 10 | 11 | 12 |
|---|---|---|---|---|---|---|---|---|---|---|---|---|
| $Li_2O$ | 2.62 | 3.84 | 3.60 | 2.84 | 2.91 | 4.43 | 4.90 | 4.85 | 5.21 | 3.79 | 4.59 |  |
| $Na_2O$ | 8.85 | 10.80 | 9.21 | 10.20 | 8.96 | 10.73 | 11.92 | 10.90 | 12.10 | 13.10 | 12.38 | 13.45 |
| $K_2O$ | 5.05 | 8.49 | 7.93 | 10.61 | 6.82 | 5.75 | 7.96 | 8.42 | 12.45 | 13.20 | 12.68 | 17.0 |
| Total $R_2O$ | 16.52 | 23.13 | 20.74 | 23.65 | 18.69 | 20.91 | 24.78 | 24.17 | 29.76 | 30.09 | 29.65 | 30.45, 16–31% |
| SrO | 1.61 |  |  |  |  |  |  |  | 3.50 |  |  |  |
| CaO | 4.86 | 8.40 | 9.07 |  | 11.92 | 7.81 | 9.99 | 10.26 | 10.60 | 12.76 | 11.74 | 10.82 |
| BaO | 25.00 | 26.96 | 30.75 | 38.89 | 18.90 | 20.42 | 14.02 | 14.15 | 14.25 | 16.10 | 15.95 | 14.8 |
| ZnO |  |  |  |  |  |  |  |  |  |  |  | 2.0 |
| Total RO | 31.47 | 35.36 | 39.82 | 38.89 | 30.82 | 28.23 | 24.01 | 24.41 | 28.35 | 28.86 | 27.69 | 27.62, 24–40% |
| $B_2O_3$ | 7.40 | 11.16 | 10.46 | 11.63 | 9.30 | 9.98 | 11.25 | 11.10 | 10.61 | 10.96 | 11.30 | 10.03 |
| $Al_2O_3$ | 3.32 | 2.96 | 2.88 | 2.42 | 3.02 | 2.98 | 3.00 | 3.06 | 3.51 | 3.76 | 4.24 | 3.98 |
| Total $R_2O_3$ | 10.72 | 14.12 | 13.34 | 14.05 | 12.32 | 12.96 | 14.25 | 14.16 | 14.12 | 14.72 | 15.54 | 14.01, 10–16% |
| $SiO_2$ | 25.81 | 17.30 | 23.01 | 18.45 | 28.81 | 19.69 | 22.53 | 23.56 | 25.30 | 24.10 | 24.81 | 27.94 |
| $TiO_2$ | 8.05 | 8.52 | 1.61 | 3.26 | 7.20 | 13.88 | 8.66 | 8.46 |  |  |  |  |
| $ZrO_2$ | 1.30 | 1.58 | 1.48 | 1.63 | 2.16 | 1.41 | 1.44 | 1.12 | 2.40 | 2.32 | 2.32 |  |
| $SnO_2$ | 6.15 |  |  |  | 2.82 | 4.34 | 3.18 |  |  |  |  |  |
| Total $RO_2$ | 41.31 | 27.40 | 26.10 | 23.34 | 38.17 | 37.80 | 36.97 | 37.32 | 27.70 | 26.42 | 27.13 | 27.94, 23–42% |

The fusion temperatures of these "frit" compositions range from 500° C. to 600° C. The compositions Nos. 9, 10, 11 and 12 are for clear glazes.

The twelve compositions listed in Tables 2 and 3 but expressed as mole percentages (falling within the ranges of Table I) are represented as follows:

TABLE 4

Frit compositions—molecular percent oxides

|  | 1 | 2 | 3 | 4 | 5 | 6 | 7 | 8 | 9 | 10 | 11 | 12 |
|---|---|---|---|---|---|---|---|---|---|---|---|---|
| $Li_2O$ | 6.9 | 9.7 | 9.2 | 7.4 | 6.9 | 10.9 | 11.5 | 11.4 | 12.0 | 8.9 | 10.7 |  |
| $Na_2O$ | 11.2 | 13.2 | 11.3 | 13.0 | 10.3 | 12.8 | 13.5 | 12.4 | 13.5 | 14.7 | 14.0 | 16.0 |
| $K_2O$ | 4.2 | 6.8 | 6.4 | 8.8 | 5.1 | 4.5 | 5.9 | 6.3 | 9.1 | 9.8 | 9.4 | 13.3 |
| Total $R_2O$ | 22.3 | 29.7 | 26.9 | 29.2 | 22.3 | 28.2 | 30.9 | 30.1 | 34.6 | 33.4 | 34.1 | 29.3 |
| SrO | 1.2 |  |  |  |  |  |  |  | 2.4 |  |  |  |
| CaO | 6.8 | 11.4 | 12.4 |  | 15.2 | 10.2 | 12.5 | 12.8 | 13.1 | 16.0 | 14.8 | 14.3 |
| BaO | 12.8 | 13.4 | 15.3 | 27.7 | 8.8 | 9.8 | 6.4 | 6.4 | 6.4 | 7.4 | 7.3 | 7.1 |
| ZnO |  |  |  |  |  |  |  |  |  |  |  | 1.8 |
| Total RO | 20.8 | 24.8 | 27.7 | 27.7 | 24.0 | 20.0 | 18.9 | 19.2 | 21.9 | 23.4 | 22.1 | 23.2 |
| $B_2O_3$ | 8.3 | 12.2 | 11.5 | 13.0 | 9.6 | 10.5 | 11.3 | 11.2 | 10.6 | 10.0 | 10.4 | 10.6 |
| $Al_2O_3$ | 2.6 | 2.2 | 2.1 | 1.9 | 2.1 | 2.1 | 2.0 | 2.1 | 2.4 | 2.6 | 2.9 | 2.9 |
| Total $R_2O_3$ | 10.9 | 14.4 | 13.6 | 14.9 | 11.7 | 12.6 | 13.3 | 13.3 | 13.0 | 12.6 | 13.3 | 13.5 |
| $SiO_2$ | 34.0 | 21.9 | 29.3 | 24.0 | 34.4 | 24.2 | 26.5 | 27.3 | 29.2 | 29.3 | 29.2 | 34.0 |
| $TiO_2$ | 7.9 | 8.2 | 1.6 | 3.2 | 6.4 | 12.8 | 7.6 | 7.4 |  |  |  |  |
| $ZrO_2$ | 0.9 | 1.0 | 0.9 | 1.0 | 1.2 | 0.8 | 0.8 | 1.2 | 1.3 | 1.3 | 1.3 |  |
| $SnO_2$ | 3.2 |  |  |  |  | 1.4 | 2.0 | 1.5 |  |  |  |  |
| Total $TiO_2 ZrO_2 SnO_2$ | 12.0 | 9.2 | 2.5 | 4.2 | 7.6 | 15.0 | 10.4 | 10.1 | 1.3 | 1.3 | 1.3 |  |
| Total $RO_2$ | 46.0 | 31.1 | 31.8 | 28.2 | 42.0 | 39.2 | 36.9 | 37.4 | 30.5 | 30.6 | 30.5 |  |
| $R_2O_3+RO_2$ | 56.9 | 45.5 | 45.4 | 43.1 | 53.7 | 51.8 | 50.2 | 50.7 | 43.5 | 43.2 | 43.8 | 47.5 |
| $R_2O+RO$ | 43.1 | 54.5 | 54.6 | 56.9 | 46.3 | 48.2 | 49.8 | 49.3 | 56.5 | 56.8 | 56.2 | 52.5 |
| Ratio: $\frac{RO_2+R_2O_3}{R_2O+RO}$ | 1.32 | .835 | .832 | .757 | 1.16 | 1.07 | 1.01 | 1.03 | .77 | .76 | .78 | .90 |

When using any selected frit for application to an article to be glazed, the powdered "frit" is brought to the fluid state by addition of water or other liquid vehicle to form a "slip" which is then applied to the article, whereupon the latter is "stoved" below 600° C.

It will be understood that when preparing the slip a mixture of two of our frits may be used. For example, one having the lowest softening temperature with one having a higher temperature or different colour. Alternatively a ground frit may be mixed with a proportion of powdered silica or the like which at the stoving temperature will become bonded into the glaze but not combine chemically with it, so as to produce a resistant matt finish.

Some operating details of interest in carrying out the invention are as follows:

The articles to be enamelled are preferably cleaned, either chemically as with an alkali wash or by treatment with a degreasing liquid, or mechanically as by sand-blasting or thermically as by heating in a furnace chamber.

In the case of applying a glaze by "stoving," the application of a first coating of the "slip" followed by a single "stoving" treatment usually results in a plain or mottled grey appearance, the actual glaze or gloss being satisfactory but a desired colour being probably imperfect because of the influence of the chemical bonding to the foundation metal. However, if the colour is as desired but a matt or egg-shell surface finish is required, this may be obtained by a second "stoving" treatment without any precoating with further "slip." If, on the other hand, it is desired to preserve the glaze and attain the desired colour, a second coating of "slip" followed by a second "stoving" treatment may be carried out.

If both glaze and colour are desired, coupled with a mottled or submerged crack effect, a second application of "slip" (either of the same colour as the first or different therefrom) followed by a quick drying, to produce a multitudinous cracking of the "biscuit," followed by a rapid "stoving" treatment may be performed.

What we now claim is:

1. A lead-free and fluorine-free vitreous enameling composition suitable for bonding to the surface of aluminum and aluminum base alloys, said composition having a fusion or maturing temperature below 600° C. and a coefficient of thermal expansion greater than $$15.0 \times 10^{-6}$$

in the temperature range 10°–100° C., said composition consisting essentially of the following constituents calculated as mole percentages:

$R_2O$, 21–36%; $RO$, 17–30%
$R_2O_3$, 8–17%; $SiO_2$, 18–36%
$RO_2$, 0–15% where $R_2O$ represents oxides selected from the group consisting of the oxides of the elements Li, Na and K, RO represents oxides selected from the group consisting of the oxides of the elements Ca, Sr and Ba, $RO_2$ represents opacifier oxides selected from the group consisting of the oxides of Ti, Zr and Sn, $R_2O_3$ represents oxides selected from the group consisting of the oxides of the elements B and Al.

2. A composition as in claim 1 wherein RO is CaO.

3. A composition as in claim 1 wherein RO is BaO.

4. A lead-free, fluorine-free, vitreous enameling composition suitable for bonding to the surface of aluminum and aluminum base alloys said composition having a fusion or maturing temperature below 600° C. and a coefficient of thermal expansion greater than $15.0 \times 10^{-6}$ in the temperature range 10°–100° C., said composition consisting essentially of the constituents calculated as mole percentages in the following ranges:

$R_2O$, 21 to 36%
$RO$, 17 to 30%
$B_2O_3$, 8 to 13%
$SiO_2$, 18 to 36% where $R_2O$ represents oxides selected from the group consisting of the oxides of the elements Li, Na and K, and RO represents oxides selected from the group consisting of the oxides of the elements Ca, Sr and Ba.

5. A lead-free, fluorine-free vitreous enameling composition suitable for bonding to the surface of aluminum and aluminum base alloys said composition having a fusion or maturing temperature below 600° C. and a coefficient of thermal expansion greater than $15.0 \times 10^{-6}$ in the temperature range 10°–100° C. said composition consisting essentially of the constituents calculated as mole percentages in the following ranges:

$R_2O$, 21 to 36%
$RO$, 17 to 30%
$B_2O_3$, 8 to 13%
$Al_2O_3$, up to 4%
$SiO_2$, 18 to 36% where $R_2O$ represents oxides selected from the group consisting of the oxides of the elements Li, Na and K, and RO represents oxides selected from the group consisting of oxides of the elements Ca, Sr and Ba.

6. A lead-free, fluorine-free, vitreous enameling composition suitable for bonding to the surface of aluminum and aluminum base alloys said composition having a fusion or maturing temperature below 600° C. and a coefficient of thermal expansion greater than $15.0 \times 10^{-6}$ in the temperature range 10°–100° C., said composition consisting essentially of the constituents calculated as mole percentages in the following ranges:

$R_2O$, 21 to 36%
$RO$, 17 to 30%
$B_2O_3$, 8 to 13%
$Al_2O_3$, up to 4%
$SiO_2$, 18 to 36%
$TiO_2$, up to 15%
$ZrO_2$, up to 5%
$SnO_2$, up to 5% where $TiO_2+ZrO_2+SnO_2$ does not exceed 15%, and where $R_2O$ represents oxides selected from the group consisting of the oxides of the elements Li, Na and K, and RO represents oxides selected from the group consisting of the oxides of the elements Ca, Sr and Ba.

7. A composition as in claim 1 wherein RO is a mixture of BaO and CaO.

REGINALD PERCY FRASER.
AFREDO LUIGI CIANCHI.

References Cited in the file of this patent

UNITED STATES PATENTS

| Number | Name | Date |
|---|---|---|
| 1,833,087 | Migeot | Nov. 24, 1931 |
| 1,944,938 | Kinzie | Jan. 30, 1934 |
| 2,414,633 | Bryant | Jan. 21, 1947 |

FOREIGN PATENTS

| Number | Country | Date |
|---|---|---|
| 156,822 | Austria | 1939 |
| 610,645 | France | 1926 |
| 868,052 | France | 1941 |
| 602,244 | Germany | 1934 |